(12) United States Patent
Adkins et al.

(10) Patent No.: US 9,606,748 B2
(45) Date of Patent: *Mar. 28, 2017

(54) IMPORTING PRE-EXISTING DATA OF A PRIOR STORAGE SOLUTION INTO A STORAGE POOL FOR USE WITH A NEW STORAGE SOLUTION

(75) Inventors: Janet E. Adkins, Austin, TX (US); David J. Craft, Wimberly, TX (US); Thomas S. Mathews, Austin, TX (US); Frank L. Nichols, III, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 1030 days.

This patent is subject to a terminal disclaimer.

(21) Appl. No.: 13/449,860

(22) Filed: Apr. 18, 2012

(65) Prior Publication Data
US 2012/0284230 A1 Nov. 8, 2012

Related U.S. Application Data

(63) Continuation of application No. 13/100,332, filed on May 4, 2011.

(51) Int. Cl.
*G06F 17/30* (2006.01)
*G06F 3/06* (2006.01)

(52) U.S. Cl.
CPC .............. *G06F 3/065* (2013.01); *G06F 3/067* (2013.01); *G06F 3/0607* (2013.01);
(Continued)

(58) Field of Classification Search
USPC .................................. 707/609–686, 809–811
See application file for complete search history.

(56) References Cited

U.S. PATENT DOCUMENTS 5,778,414 A * 7/1998 Winter et al. ..................... 711/5
6,532,527 B2 3/2003 Selkirk et al.
(Continued)

FOREIGN PATENT DOCUMENTS

| CN | 101101563 A | 1/2008 |
|---|---|---|
| CN | 101223498 A | 7/2008 |
| JP | 2007048323 | 2/2007 |

OTHER PUBLICATIONS

U.S. Appl. No. 13/100,332, Image File Wrapper printed Apr. 18, 2012, 1 page.
(Continued)

*Primary Examiner* — Boris Gorney
*Assistant Examiner* — Amanda Willis
(74) *Attorney, Agent, or Firm* — Stephen J. Walder, Jr.; Thomas E. Tyson

(57) ABSTRACT

Mechanisms are provided for importing pre-existing data into a storage system utilizing a current storage management system that is different from an original storage management system used to create the pre-existing data. One or more data storage devices are integrated into the storage system in-place without modification of the pre-existing data stored on the one or more data storage devices. Metadata for the pre-existing data is created based on a linear progression of data in the pre-existing data. Read access requests targeting the pre-existing data are executed using the created metadata. Write access requests targeting the pre-existing data are executed by redirecting the write access requests to a copy of the pre-existing data created in another storage location.

19 Claims, 3 Drawing Sheets

(52) U.S. Cl.
CPC .... *G06F 17/3038* (2013.01); *G06F 17/30079* (2013.01); *G06F 17/30088* (2013.01); *G06F 17/30575* (2013.01)

(56) References Cited

U.S. PATENT DOCUMENTS

| | | |
|---|---|---|
| 7,363,457 B1 | 4/2008 | Dekoning et al. |
| 7,571,182 B1 | 8/2009 | Eddy |
| 7,676,486 B1 | 3/2010 | Tulkoff et al. |
| 7,689,803 B2 | 3/2010 | Karr et al. |
| 2005/0114595 A1 | 5/2005 | Karr et al. |
| 2007/0260840 A1* | 11/2007 | Watanabe ............. 711/165 |
| 2009/0193063 A1* | 7/2009 | Leroux et al. ............. 707/204 |
| 2009/0193185 A1 | 7/2009 | Cheng |
| 2010/0011368 A1 | 1/2010 | Arakawa et al. |
| 2010/0082765 A1* | 4/2010 | Murase ............. 709/213 |
| 2010/0235592 A1 | 9/2010 | Kaneda et al. |

OTHER PUBLICATIONS

Office Action dated Jan. 26, 2015 received from the Chinese Patent Office (SIPO) for Application No. 201210135762.3, 14 pages (untranslated).

\* cited by examiner

IMPORTING PRE-EXISTING DATA OF A PRIOR STORAGE SOLUTION INTO A STORAGE POOL FOR USE WITH A NEW STORAGE SOLUTION

This application is a continuation of application Ser. No. 13/100,332, filed May 4, 2011, status pending.

BACKGROUND

The present application relates generally to an improved data processing apparatus and method and more specifically to mechanisms for importing pre-existing data of a prior storage solution into a storage pool for use with a new storage solution.

With the introduction of new data storage management solutions into a customer environment, the continued use of pre-existing data created within an older storage management solution often needs to be maintained. This continued use of pre-existing data is usually handled in one of three ways. In a first option, the pre-existing storage management solution is maintained side-by-side with the new storage management solution. This option limits the customer because no new functional capabilities with the newer storage management solution can be shared with the pre-existing data under continued management of the older storage management solution. Moreover, this option introduces additional management complexity because the old storage management solution must be maintained along with the new storage management solution.

In a second option, the data may be dumped to a raw format media, e.g., magnetic tape, and then re-imported into the new storage management solution as if it were new data. This solution tends to be impractical due to the massive amounts of data involved and the time required to move data between systems, e.g., between the host system and a raw format media system and then back from the raw format media system into the system configured with the new storage management solution.

As a third option, the new storage management solution may be developed so that it ensures compatibility with the old storage management solution and thus, merely adds-on to the pre-existing storage management solution. This option often limits the user to a product line from one exclusive vendor, i.e. the customer can only obtain storage management solutions from the same vendor since the customer requires backward compatibility to access the pre-existing data, and often does not expand the data management capability of the pre-existing data since the new storage management solution is limited in what it can do by the need to provide backward compatibility. This is primarily because the data in the storage management solution is often closely tied and described by internal storage solution metadata that is proprietary to the pre-existing storage management solution.

SUMMARY

In one illustrative embodiment, a method, in a data processing system, is provided for importing pre-existing data into a storage system utilizing a current storage management system that is different from an original storage management system used to create the pre-existing data. The method comprises integrating one or more data storage devices into the storage system in-place without modification of the pre-existing data stored on the one or more data storage devices. The method further comprises creating metadata for the pre-existing data based on a linear progression of data in the pre-existing data. Moreover, the method comprises executing read access requests targeting the pre-existing data using the created metadata. In addition, the method comprises executing write access requests targeting the pre-existing data by redirecting the write access requests to a copy of the pre-existing data created in another storage location.

In other illustrative embodiments, a computer program product comprising a computer useable or readable medium having a computer readable program is provided. The computer readable program, when executed on a computing device, causes the computing device to import pre-existing data into a storage system utilizing a current storage management system that is different from an original storage management system used to create the pre-existing data, by performing various ones of, and combinations of, the operations outlined above with regard to the method illustrative embodiment.

In yet another illustrative embodiment, system/apparatus is provided that comprises a storage management system and a storage system comprising one or more first data storage devices storing data created using the storage management system. The storage management system is configured to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
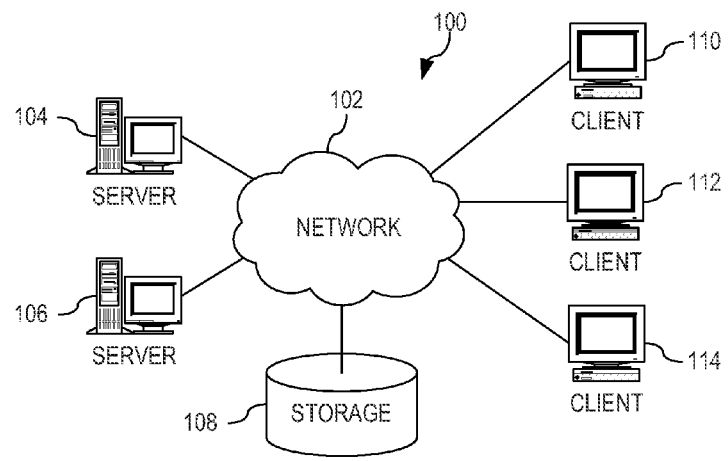
FIG. 1 is a pictorial representation of an example distributed data processing system in which aspects of the illustrative embodiments may be implemented.

The illustrative embodiments address the problems in the prior art by provide a mechanism for importing pre-existing data of a prior storage solution "in place" into a storage pool for use with a new storage solution. What is meant by the term "in place" is that the data does not have to be dumped into a raw format on an intermediate raw format media but instead, the data can continue to reside on the exact same physical media in which it originally resided under the older storage management solution.

The illustrative embodiment will be described in terms of data being provided in storage devices corresponding to logic unit numbers (LUNs). LUNs are numbers assigned to logical units of a storage system. A logical unit of a storage system comprises one or more storage devices addressed by the Small Computer System Interface (SCSI) protocol or similar protocols, such as Fibre Channel or iSCSI. A LUN may be used with any device that supports read/write operations, such as a tape drive, hard disk, solid state disk, or the like, but is most often used to refer to a logical disk created in a storage area network (SAN). While LUNs are the actual logical identifier of a set of storage locations on one or more physical storage devices, the term LUN is often used to refer to the physical devices or logical disks themselves and such convention will be used herein as well.

With the illustrative embodiments described herein, one or more pre-existing LUNs, i.e. one or more sets of storage locations, that store "old" data "in place," are imported into a separate non-metadata storage tier of a multi-tiered storage system having a new storage management pool, i.e. a collection of multiple LUNs that may comprise a combination of pre-existing or "old" data created under a prior storage management system, and "new" data created under a new storage management system. The metadata to describe the linear layout of the pre-existing LUN(s) is maintained within the metadata storage tier of the multi-tiered storage system having the new storage management pool. The linear layout of the pre-existing LUN can be easily described by the new storage management metadata and any access to the pre-existing LUN is performed using the new metadata description. Once accesses start occurring through the new storage management pool using the new metadata description, advanced capabilities of the new storage management system, such as snapshots, clones, or the like, can be applied to the "old" data.

In this way, new metadata is "wrapped around" pre-existing LUNs such that new functionality of a new storage management system may be utilized with "old" data without having to implement the inefficient, complex, or impractical mechanisms described above with regard to the prior art. In addition, the use of the mechanisms of the illustrative embodiments allows new modifications to pre-existing, or "old" data, to be redirected to a different and new LUN in the new storage management pool. That is, when a new modification is to be performed on the pre-existing or "old" data, this modification may be performed to a new copy of the old data in a new LUN of the new storage management pool and then future accesses to the data may be redirected to this new copy of the data. In this way, the pre-existing or "old" data is slowly migrated onto new LUNs of the new storage management pool using the new metadata of the new storage management system.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
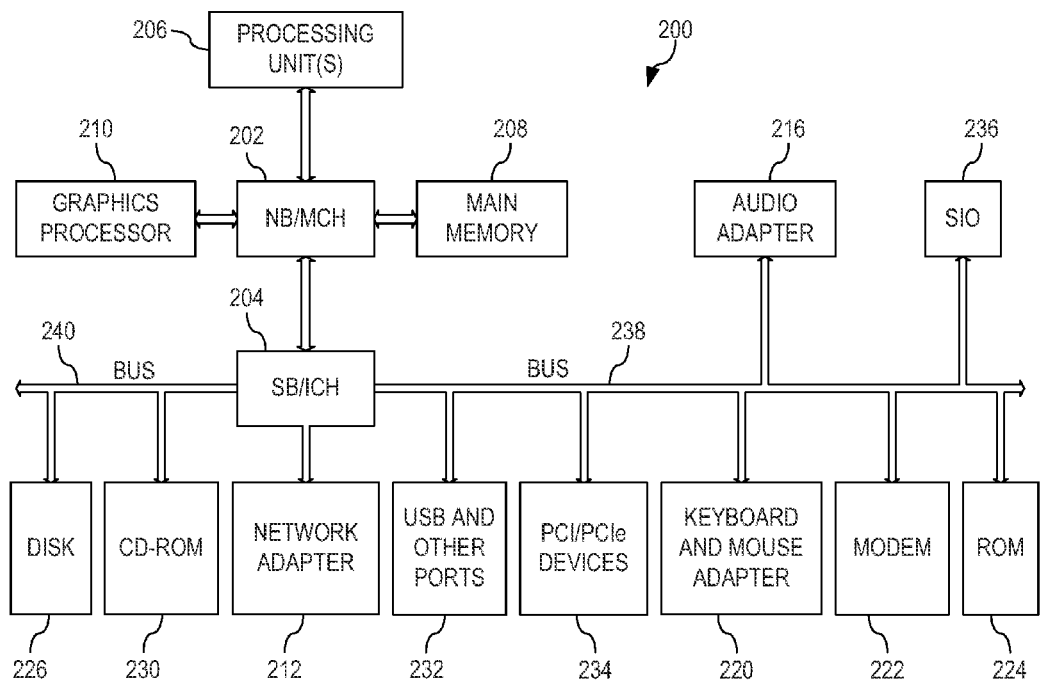
FIG. 2 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As mentioned above, the illustrative embodiments provide a mechanism for importing pre-existing data "in place" into a new storage management pool associated with a new storage management system. For example, with reference again to FIG. 1, assume that a computing system, such as server 104 and/or 106 has an associated multi-tiered data storage system, such as may be stored in one or more network attached storage units 108 or other storage devices associated with one or more of server 104 and/or 106. In one illustrative embodiment, the multi-tiered data storage system is a clustered file system and storage pool system, as will be described hereafter.

Figure 3:
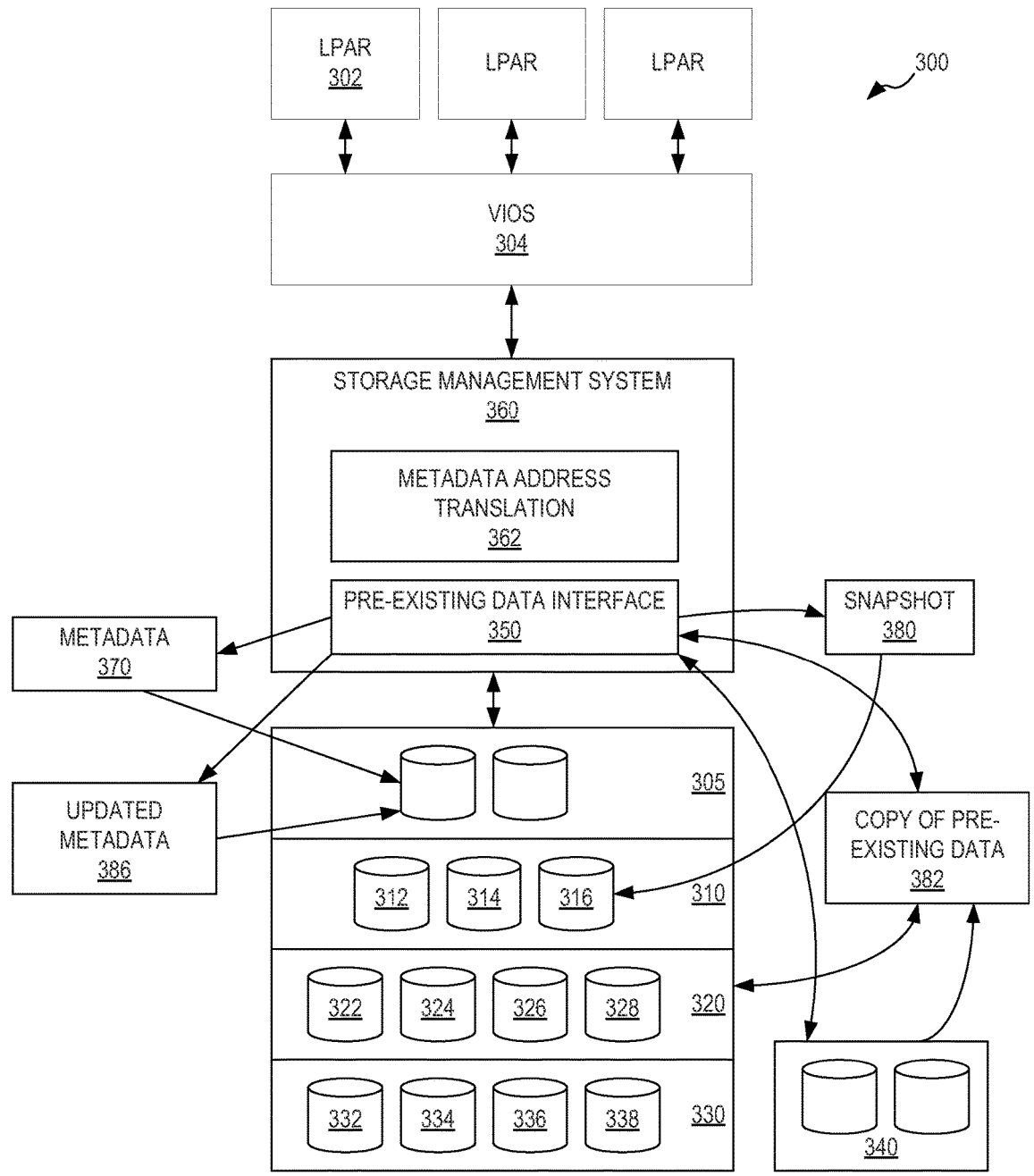
FIG. 3 is an example diagram of a multi-tiered data storage system in accordance with one illustrative embodiment.

FIG. 3 is an example diagram of a multi-tiered data storage system in accordance with one illustrative embodiment. As shown in FIG. 3, the multi-tiered data storage system 300 is a storage system having sets of storage devices 312-316, 322-328, and 332-338 configured in tiers or groups 310, 320, and 330, where each tier or group may have different performance capabilities and may be configured for the storage of different types of data. For example, in one illustrative embodiment, a low tier 330 of the multi-tiered storage system 300 may be associated with infrequently accessed data, a middle tier 320 may be associated with more frequently accessed data, a top tier 310 may be associated with cached data or data that is frequently accessed, or the like. Each tier 310, 320, and 330 of storage devices may be comprised of one or more physical storage devices 312-316, 322-328, and 332-338 of a same or different type. For example, the low tier 330 of the multi-tiered storage system 300 may be comprised of relatively slow hard drives used for archival purposes while the top tier 310 of the multi-tiered storage system may be comprised of solid state disks (SSDs) or the like due to their relative high speed access performance. Other types of multi-tiered structures 300 having more or less tiers and different types of storage devices may be used without departing from the spirit and scope of the illustrative embodiments.

The multi-tiered storage system 300, in accordance with one illustrative embodiment, is a combination of a clustered file system and a storage pool system wherein LUNs are part of a storage pool and the aggregate content of the storage is presented as available storage space to the clustered file system. The storage pool is comprised of multiple storage tiers 310, 320, and 330, and certain data may be placed on certain tiers depending on performance criteria, such as access usage and the like. Thus, as discussed above, data that is infrequently accessed may be placed in storage tier 330 and frequently accessed data may be placed in storage tier 310.

In accordance with the illustrative embodiments, the multi-tiered storage system 300 includes a tier 305 of one or more storage devices for storing metadata, i.e. data that describes the data stored in the other tiers 310, 320, and 330, of the multi-tiered storage system 300. This is referred to as the system storage tier 305 and in fact may store the metadata as well as user data if the user has not specifically set up unique storage tiers in the particular implementation of the multi-tiered storage system 300. All the other tiers 310, 320, and 330, beyond the system storage tier 305 contain user data only. Thus, the descriptive meta-data for user data may appear to be, and may in actuality be, stored separately from the user data that the metadata is describing. Since the metadata for the user data is stored separately from the actual user data itself, pre-existing data in pre-existing LUNs may be imported into the storage pool "in-place" with no data movement of the originally imported LUNs.

With the illustrative embodiments, pre-existing or "old" data, when being imported into a new storage system 300 having a new storage management system, are brought into the new storage system 300 "in place" without movement of the data. That is, the physical storage devices may be brought into the system 300 as is without modification.

The new storage management system may utilize metadata for describing the data in the storage system 300 that is not compatible with metadata used by a prior storage management system used to create the pre-existing or "old" data. That is, with storage management systems, the storage virtualization solutions employed vary in their layout and manipulation capabilities for translating virtual to physical data addressing. For example, some storage management system virtualization solutions, such as the pre-existing or "old" data storage management system of the examples of the illustrative embodiments, are quite simplistic and have little virtualization capabilities other than presenting a set of physical disks as one virtual LUN that is nothing more than a concatenation of the physical disks. Others, such as the new storage management system of the examples used to describe the illustrative embodiments, may be fairly sophisticated and may have a sophisticated metadata capability that allows complex data layouts on multiple LUNs and allows physical data placement moves while still presenting an unchanged virtual layout during runtime. It should be appreciated that this is only an example and that a relative difference in complexity is not required for use of the illustrative embodiments, only that the metadata of a storage management system used to create the pre-existing or "old" data is incompatible with the metadata of the new storage management system of the storage system 300.

The physical storage devices that store the pre-existing or "old" data may be incorporated into the storage system 300 as a unique storage tier 340 separate from the metadata tier 305 and, in some illustrative embodiments, separate from other tiers 310, 320, and 330 in the multi-tiered storage system 300. In other illustrative embodiments, the preexisting or "old" data may be part of a tier storing data configured for use with the new storage management system as well.

The LUNs of the pre-existing or "old" data are associated with an interface 350 in a storage management system 360 such that when the LUNs are read, they are accessed as a linear progression of data and offsets associated with the data. The interface 350 and storage management system 360 may be implemented as software, hardware, or any combination of software and hardware. In one illustrative embodiment, the interface 350 and storage management system 360 are implemented as software instructions executed by one or more processors of one or more data processing systems.

The interface 350 builds a set of metadata 370 detailing the linear progression of data within the LUNs and combines this metadata under a single file object 370 that appears within the file system. The metadata 370 represents a one-to-one mapping of address and offset to physical storage location on the physical storage devices, i.e. there is no virtualization assumed for the imported pre-existing data. Thus, the offsets identified in the metadata 370 provide metadata pointers directly pointing to the physical location of the data on the physical storage devices on which the LUNs are stored.

It should be noted that the description of the illustrative embodiments set forth herein assumes that the LUNs represent the actual physical storage devices, but the illustrative embodiments are not limited to such. Rather, the LUNs may in fact be virtual LUNs if the storage management system used to create the pre-existing data supported a storage virtualization solution. As a result, when the mapping for the imported LUNs is built, a linear layout is assumed, because this is the semantic for the accessor of a LUN served by an external storage system, and thus, the offsets may specify a virtual mapping of physical LUNs within an external storage controller.

With reference again to FIG. 3, effectively, the building of the set of metadata for the imported LUNs as a linear progression of data and offsets associated with the data gives a new access name for the LUN. When the LUN is read through the storage management system 360, e.g., in response to a read request from a logical partition (LPAR) client 302 via a virtual input/output server (VIOS) 304, metadata address translation mechanisms 362 of the storage management system 360 points to the pre-existing LUN data at the offset associated with the metadata pointer. When the LUN is written to, the storage management system 360 implements a redirect on write (ROW) operation. That is, when there is a write to the pre-existing LUNs, a snapshot 380 of the pre-existing data in the pre-existing LUNs is generated, i.e. an instant copy of the data representing the state of the data at the particular time that the copy of data is generated. A copy of the pre-existing data 382 is generated at a new location in a same or different tier 310, 320, 330, or 340 of the multi-tiered storage system 300.

The modifications to the pre-existing data are then applied to the new location of the data in the same or different tier 310, 320, 330, or 340. The metadata for the "old" data is updated with metadata 386 that redirects accesses to the data ("old" or modified) to the new location of the modified copy of the data 382. This new metadata 386 is in the format and of the type used by the new storage management system 360 and implements any virtualization implemented by the new storage management system 360, i.e. the new metadata 386 utilizes user space or virtual addresses within the user/virtual address space implemented by the new storage management system 360 that may be translated by the address translation mechanisms 362 into physical addresses for accessing the new location of the modified copy of the data 382.

It should be noted that the storage system is capable of differentiating between LUNs that store pre-existing data that was created under a previous storage management system and copies of these LUNs that store data created under the current storage management system. This may be done in a number of different ways. One way in which this may be done is by using snapshots and generation number tags. That is, a snapshot preserves a metadata tree at a particular point in time. Whenever a block of data is "born" in the storage system of the illustrative embodiments, i.e. it is first allocated, it may be associated with a generation number, e.g., generation "323." The generation is tagged with the metadata that points to that block that was just allocated so that the metadata essentially identifies, for example, block "10" being a location LUN "20," offset 0x23234 and that this block "10" was allocated as part of generation "323." When the snapshot is created, the storage system essentially is setting a condition that blocks within generation "323" or earlier are to be preserved and not deleted. When the snapshot is created, the generation number is incremented such that blocks of data allocated after the snapshot have a Eater generation number, e.g., "324." Thus, the storage system can always tell what blocks of data need to be preserved, e.g., blocks on the pre-existing or "old" LUNs, and blocks that are not being preserved by a point in time snapshot and can be updated in place.

In this way, pre-existing data in pre-existing LUNs are imported into the multi-tiered storage system 300 "in-place" without modification to the data being required for read access to the data. Metadata for locating data on these pre-existing LUNs uses a one-to-one address mapping where the address or pointer in the metadata points to a physical location within a linear progression of data of the LUN. If the data is not modified, then the pre-existing data in the pre-existing LUN is not updated or moved and the data remains "in-place." The data is only moved to another storage location, e.g., another tier of the multi-tiered storage system 300, if the data is being modified, such as due to a write to the data being performed. In such a case, a snapshot of the data is generated and a copy of the data is created in a new location of the multi-tiered storage system 300. The modifications are made to the copy of the data in the new location while the snapshot preserves the original state of the data at the time just prior to the modification being performed. The metadata associated with the data is updated to point to the new location of the copy of the data so that future accesses to the data are performed on this new data.

As a result, the pre-existing data in the pre-existing LUNs may be incrementally migrated into the multi-tiered storage system 300 such that the new capabilities of the new storage management system 360 may be executed with regard to the migrated data. For example, LUNs that, prior to the implementation of the new storage management system 360, were not capable of being the subject of snapshots due to the limitations of the prior storage management system under which they were created, may now, through the mechanisms of the illustrative embodiments and the incremental migration capabilities, be the subject of such advanced capabilities. Furthermore, the VIOS 304 may present the migrated data or LUNs as new block devices, e.g., LUNs to the client LPAR clients 302.

Figure 4:
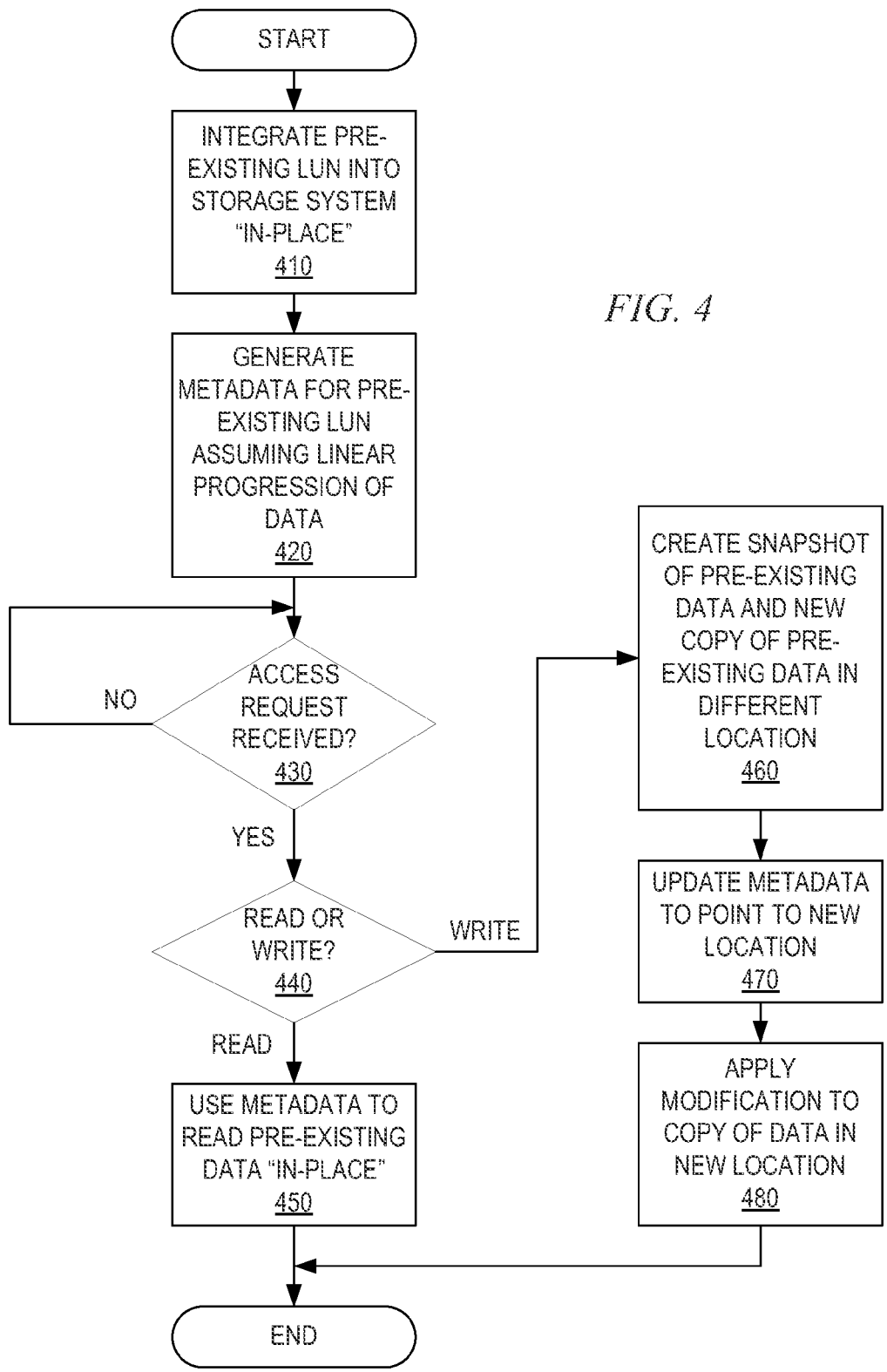
FIG. 4 is a flowchart outlining an example operation for importing a pre-existing LUN into a multi-tiered storage system utilizing a new storage management system in accordance with one illustrative embodiment.

FIG. 4 is a flowchart outlining an example operation for importing a pre-existing LUN into a multi-tiered storage system utilizing a new storage management system in accordance with one illustrative embodiment. The operation of FIG. 4 may be performed by a storage management system of a multi-tiered storage system, for example.

As shown in FIG. 4, the operation starts with the inclusion of the pre-existing LUN into a multi-tiered storage system "in-place" (step 410). Metadata for the pre-existing LUN is generated in the system storage tier for the pre-existing LUN assuming a linear progression of data with the metadata pointers pointing directly to the physical storage locations of the data on the pre-existing LUN (step 420). Thereafter, a determination is made as to whether an access request is received directed to the pre-existing LUN (step 430). If not, then the operation returns to step 430 and awaits an access request to be received.

If an access request is received, then a determination is made as to whether the access requested is a read or a write (step 440). If the access request is a read access, then the metadata is used to access the data from the pre-existing LUNs "in-place" without moving the data or modifying the metadata for the pre-existing LUN (step 450). The operation then returns to step 430 for a future access request to be received.

If the access request is a write access request (step 440), a copy of the data in the pre-existing LUN is created and a new copy of the data is generated in a separate storage location within the multi-tiered storage system (step 460). The metadata is updated to point to the new location of the copy of the data (step 470). Thereafter, the modification made by the write access request is performed on the copy of the data in the new location (step 480). The operation then terminates. It should be appreciated that thereafter, read and write accesses to the same data are, via the updated metadata, directed to the new location where the copy of the data is located.

Thus, the illustrative embodiments provide mechanisms for importing pre-existing data from pre-existing LUNs, or other physical or logical groupings of data, "in-place" into a storage system that utilizes a new or different storage management system than that used to create the pre-existing data in the pre-existing LUNs. The illustrative embodiments provide mechanisms for the gradual and incremental migration of the pre-existing data from the pre-existing LUNs into new LUNs configured under the new storage management system, upon which the new capabilities of the new storage management system may be implemented. In so doing, the illustrative embodiments avoid the drawbacks discussed above with regard to known mechanisms.

It should be appreciated that while the illustrative embodiments are described in terms of a multi-tiered storage system and the data being provided as LUNs, the illustrative embodiments and the present invention are not limited to such. To the contrary, the illustrative embodiments may be utilized with any storage system architecture in which the pre-existing data may be separately stored or differentiated from the data created under the storage management system of the storage system such that the pre-existing data may be handled in accordance with the mechanisms described above. Such a storage system may be a single tier storage system or multi-tiered storage system. Moreover, other groupings or logical arrangements of data other than LUNs may be used without departing from the spirit and scope of the illustrative embodiments. For example, the groupings or logical arrangements of data may be made based on tiers of a storage system, or the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for importing pre-existing data into a first storage system of the data processing system utilizing a current storage management system that is different from an original storage management system used to create the pre-existing data, the method comprising:

integrating one or more data storage devices into the first storage system in-place without modification of the pre-existing data stored on the one or more data storage devices;

creating metadata for the pre-existing data based on a linear progression of data in the pre-existing data, wherein the metadata specifies location information for locating portions of data in the pre-existing data of the one or more data storage devices based on an assumption of a linear progression of data in the pre-existing data;

executing read access requests targeting the pre-existing data using the created metadata; and executing write access requests targeting the pre-existing data by redirecting the write access requests to a copy of the pre-existing data created in another storage location, wherein the metadata that is created has a configuration, corresponding to the current storage management system used to manage storage devices of the first storage system, that is a different configuration from metadata used by the original storage management system when creating the pre-existing data in a second storage system different from the first storage system.

2. The method of claim 1, wherein executing write access requests further comprises:

creating the copy of the pre-existing data in the other storage location, wherein the copy of the pre-existing data is created only in response to a write access request targeting the pre-existing data.

3. The method of claim 2, wherein the first storage system is a multi-tiered data storage system and wherein the copy of the pre-existing data is created in a different tier of the multi-tiered data storage system from a tier in which the one or more storage devices storing the pre-existing data are present.

4. The method of claim 2, further comprising:

updating the created metadata to point to the copy of the pre-existing data in response to creating the copy of the pre-existing data in the other storage location.

5. The method of claim 1, further comprising:

performing an operation, supported by the current storage management system, that is not supported by the original storage management system, on the pre-existing data using the created metadata for the pre-existing data.

6. The method of claim 1, wherein the first storage system is a multi-tiered data storage system, and wherein the created metadata is stored in a first tier of the multi-tiered data storage system separate from the pre-existing data stored on the one or more data storage devices that are integrated into a second tier of the multi-tiered data storage system.

7. The method of claim 1, wherein the first storage system is a multi-tiered data storage system, and wherein the one or more data storage devices storing the pre-existing data are integrated into the multi-tiered data storage system as a unique tier within the multi-tiered data storage system.

8. The method of claim 1, wherein the first storage system is a multi-tiered data storage system, and wherein the one or more data storage devices storing the pre-existing data are integrated into the multi-tiered data storage system as part of a tier of one or more storage devices that store data configured for use with the current storage management system such that the tier comprises one or more storage devices having data configured for use with the current storage management system and one or more storage devices having the pre-existing data configured for use with the original storage management system.

9. The method of claim 1, wherein the generated metadata provides pointers directly pointing to physical locations of data in the pre-existing data of the one or more data storage devices.

10. The method of claim 1, wherein data, in the pre-existing data, is copied to the another storage location only in response to the data processing system performing an operation to modify the data in the pre-existing data, and wherein data, in the pre-existing data, that is not modified by an operation from the data processing system is not copied to the another storage location.

11. A method, in a data processing system, for importing pre-existing data into a storage system utilizing a current storage management system that is different from an original storage management system used to create the pre-existing data, the method comprising:

integrating one or more data storage devices into the storage system in-place without modification of the pre-existing data stored on the one or more data storage devices;

creating metadata for the pre-existing data based on a linear progression of data in the pre-existing data;

executing read access requests targeting the pre-existing data using the created metadata; and executing write access requests targeting the pre-existing data by redirecting the write access requests to a copy of the pre-existing data created in another storage location, wherein the generated metadata is separate from, and is not compatible with, pre-existing metadata associated with the pre-existing data of the one or more storage devices, and wherein the current storage management system utilizes the generated metadata and does not use the pre-existing metadata, to access the pre-existing data of the one or more storage devices.

12. A method, in a data processing system, for importing pre-existing data into a storage system utilizing a current storage management system that is different from an original storage management system used to create the pre-existing data, the method comprising:

integrating one or more data storage devices into the storage system in-place without modification of the pre-existing data stored on the one or more data storage devices;

creating metadata for the pre-existing data based on a linear progression of data in the pre-existing data;

executing read access requests targeting the pre-existing data using the created metadata; and executing write access requests targeting the pre-existing data by redirecting the write access requests to a copy of the pre-existing data created in another storage location, wherein the generated metadata represents a one-to-one mapping of address and offset to physical storage location on the one or more storage devices with an assumption that no virtualization mechanism is used with the pre-existing data of the one or more storage devices.

13. The method of claim 12, wherein executing write access requests further comprises:

creating the copy of the pre-existing data in the other storage location, wherein the copy of the pre-existing data is created only in response to a write access request targeting the pre-existing data.

14. The method of claim 13, wherein the storage system is a multi-tiered data storage system and wherein the copy of the pre-existing data is created in a different tier of the multi-tiered data storage system from a tier in which the one or more storage devices storing the pre-existing data are present.

15. The method of claim 13, further comprising:
updating the created metadata to point to the copy of the pre-existing data in response to creating the copy of the pre-existing data in the other storage location.

16. The method of claim 12, further comprising:
performing an operation, supported by the current storage management system, that is not supported by the original storage management system, on the pre-existing data using the created metadata for the pre-existing data.

17. The method of claim 12, wherein the storage system is a multi-tiered data storage system, and wherein the created metadata is stored in a first tier of the multi-tiered data storage system separate from the pre-existing data stored on the one or more data storage devices that are integrated into a second tier of the multi-tiered data storage system.

18. The method of claim 12, wherein the storage system is a multi-tiered data storage system, and wherein the one or more data storage devices storing the pre-existing data are integrated into the multi-tiered data storage system as a unique tier within the multi-tiered data storage system.

19. The method of claim 12, wherein the storage system is a multi-tiered data storage system, and wherein the one or more data storage devices storing the pre-existing data are integrated into the multi-tiered data storage system as part of a tier of one or more storage devices that store data configured for use with the current storage management system such that the tier comprises one or more storage devices having data configured for use with the current storage management system and one or more storage devices having the pre-existing data configured for use with the original storage management system.

* * * * *